(12) United States Patent
Kaplan

(10) Patent No.: US 7,359,611 B1
(45) Date of Patent: Apr. 15, 2008

(54) SLACK CABLE STORAGE BOX WITH ADJUSTABLE HEIGHT SPOOLS

(75) Inventor: Steven E. Kaplan, Elyria, OH (US)

(73) Assignee: Multilink, Inc., Elyria, OH (US)

( * ) Notice: Subject to any disclaimer, the term of this patent is extended or adjusted under 35 U.S.C. 154(b) by 0 days.

(21) Appl. No.: 11/678,087

(22) Filed: Feb. 23, 2007

(51) Int. Cl.
*G02B 6/00* (2006.01)

(52) U.S. Cl. ...................... 385/135; 385/134

(58) Field of Classification Search ............. 385/134, 385/135, 136, 137, 138, 139
See application file for complete search history.

(56) References Cited

U.S. PATENT DOCUMENTS

| | | | | |
|---|---|---|---|---|
| 5,119,459 A | * | 6/1992 | Meyerhoefer et al. | 385/135 |
| 5,718,397 A | * | 2/1998 | Stevens | 242/608.8 |
| 5,894,540 A | * | 4/1999 | Drewing | 385/135 |
| 5,947,765 A | | 9/1999 | Carlson et al. | 439/535 |
| 6,256,444 B1 | * | 7/2001 | Bechamps et al. | 385/134 |
| 6,398,149 B1 | * | 6/2002 | Hines et al. | 242/399 |
| 2005/0145522 A1 | | 7/2005 | Bloodworth et al. | 206/409 |
| 2006/0254817 A1 | | 11/2006 | Caveney | 174/481 |
| 2007/0086721 A1 | | 4/2007 | Dobbins et al. | 385/135 |

* cited by examiner

*Primary Examiner*—Brian M Healy
(74) *Attorney, Agent, or Firm*—Renner, Otto, Boisselle & Sklar, LLP

(57) ABSTRACT

Slack cable storage box includes at least one slack cable storage spool that is mountable at different heights within the box. Alternatively at least two such spools may be mounted in axial alignment with one on top of the other within the box depending on the particular need and the desired amount of slack cable to be stored within the box.

14 Claims, 3 Drawing Sheets

US 7,359,611 B1

SLACK CABLE STORAGE BOX WITH ADJUSTABLE HEIGHT SPOOLS

FIELD OF THE INVENTION

This invention relates to a slack cable storage box in which a single slack cable storage spool may be mounted at different heights within the box or two such spools may be mounted in axial alignment one on top of the other inside the box depending on the particular application and the desired amount of slack cable to be stored in the box.

BACKGROUND OF THE INVENTION

It is known to store lengths of cable on a spool within a slack cable storage box for later use in running network or broadband cable service or the like when desired. The cable is wrapped around the spool inside the box in order to maintain a minimum bend radius of the cable within the box to prevent cable breakage, which, for example, in the case of optical fibers may be on the order of ten times the fiber diameter.

The spool may be detachable from the box for ease of winding the cable onto the spool and/or removal of cable from the spool. The amount of cable to be stored in a given size box may vary depending on the particular application. For example, some applications may require more cable storage capacity inside the box than other applications. Also different applications may make it desirable to have additional space above or below the spool for storage of additional materials inside the box and/or to maintain the minimum bend radius in the cable when the cable is fed into or out of side holes in the box or through a center hole in the back of the box.

SUMMARY OF THE INVENTION

The present invention addresses these different needs in the same box by providing for the selective mounting of a single slack cable storage spool at different heights within the box or mounting more than one spool in the box in axial alignment with each other.

In accordance with one aspect of the invention, the slack cable storage box includes at least two sets of spool mounts extending axially outwardly from a back wall of the box, each set being of a different length for mounting one or more slack cable storage spools at different heights within the box.

In accordance with another aspect of the invention, the one or more spools include a set of mounting holes for attaching the spools to either set of spool mounts, and a set of slots or openings for extension of the longer set of spool mounts through the slots or openings when the spool is mounted on the shorter set of spool mounts.

In accordance with another aspect of the invention, at least two cable storage spools may be mounted at different heights on different sets of different length spool mounts within the box.

In accordance with another aspect of the invention, each of the cable storage spools may include a plurality of spool segments with circumferentially spaced gaps between the spool segments to provide cable access through the gaps.

In accordance with another aspect of the invention, the box may include one or more side wall openings to permit cable to be fed into and out of the box through the side wall openings.

In accordance with another aspect of the invention, the box may include a back wall opening to permit cable to be fed into and out of the box through the back wall opening.

These and other objects, advantages, features and aspects of the present invention will become apparent as the following description proceeds.

To the accomplishment of the foregoing and related ends, the invention, then, comprises the features hereinafter more fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE INVENTION

Figure 1:
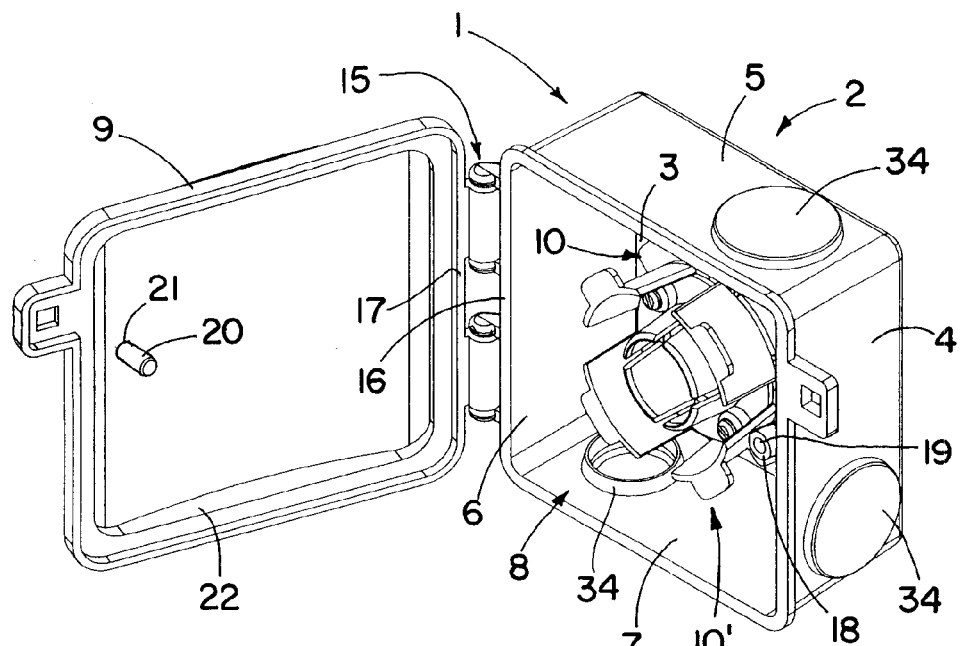
FIG. 1 is a perspective view of one form of slack cable storage box of the present invention as viewed from the front showing two slack cable storage spools mounted in axial alignment with one another inside the box.
Figure 2:
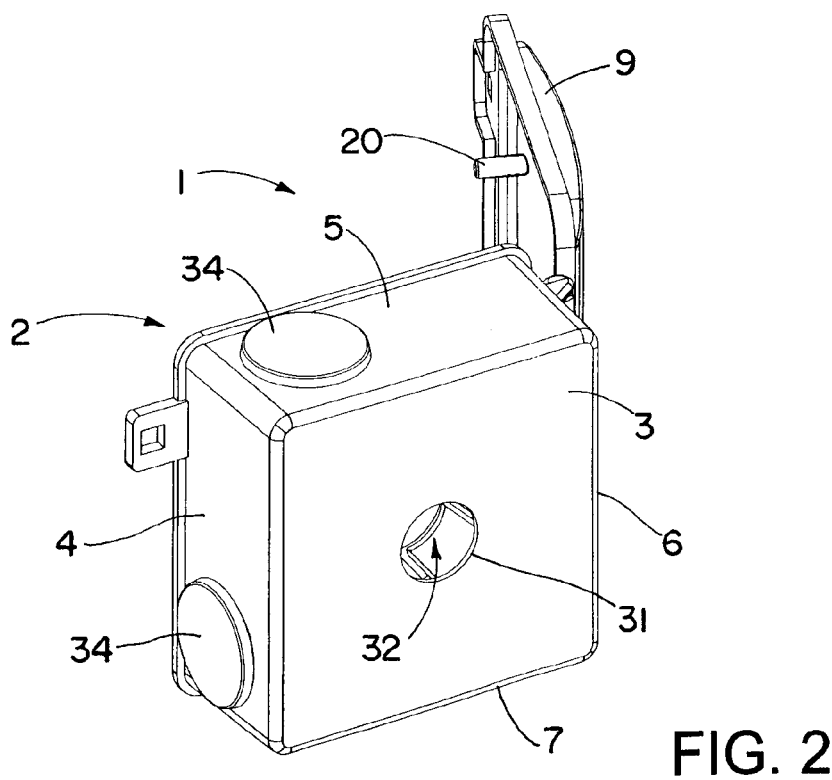
FIG. 2 is a perspective view of the box of FIG. 1 as viewed from the back.
Figure 3:
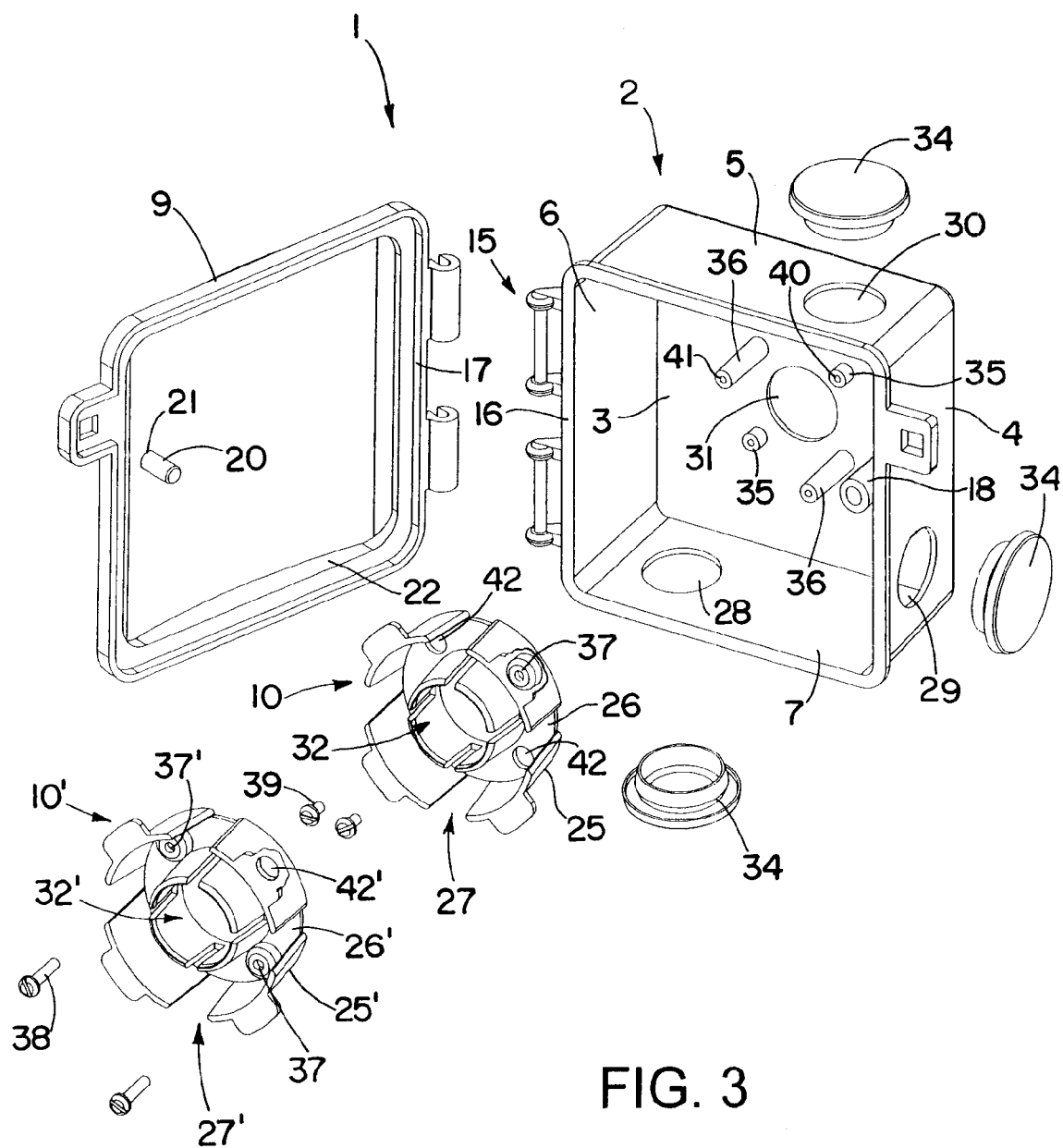
FIG. 3 is an exploded perspective view of the box and slack cable storage spools of FIG. 1.

Referring now more particularly to the drawings, wherein like reference numerals followed by a prime symbol (') are used to designate like parts, and initially to FIGS. 1-3, there is shown one form of slack cable storage box 1 of the present invention including an enclosure 2 having a back wall 3, side walls 4-7 and an open front 8. A removable cover 9 is provided for selectively accessing the enclosure through the open front. Within enclosure 2 are one or more slack cable storage spools 10, 10' for storing a desired length of cable within the box for later use in running network or broadband cable service or the like wherever desired. Suitable fasteners (not shown) may be used to mount the slack cable storage box to any desired support structure.

Cover 9 may be removably attached to enclosure 2 in any convenient manner, for example, by providing a hinge connection 15 between respective side edges 16 and 17 of the enclosure and cover. To secure the cover in the closed position, an attachment post 18 may be provided for example on the enclosure bottom wall 3 in spaced relation from the hinge 15. Post 18 may include a threaded bore 19 for threaded receipt of a fastener 20 extending through a fastener opening 21 in the cover. A sealing gasket 22 may be provided on the cover to seal against the enclosure side walls when the cover is closed to make the slack storage box weatherproof for exterior use.

FIG. 1 shows two slack cable storage spools 10 and 10' mounted in axial alignment one on top of the other inside the enclosure to provide for increased storage capacity of slack cable (not shown) around both spools inside the enclosure. As best seen in FIG. 3, both spools 10 and 10' may be virtually identical to each other, each including a plurality of circumferentially spaced arcuate spool segments 25, 25' extending axially outwardly from a central hub portion 26, 26', with circumferentially spaced gaps 27, 27' between the spool segments to provide for easy cable access through any one of a plurality of openings 28-30 in one or more of the enclosure side walls and/or an opening 31 in the enclosure bottom wall 3 through the open center 32, 32' of the spools. Any of the openings in the enclosure that are not used for cable access may be closed by suitable removable plug seals 34.

The spools 10, 10' may be mounted within the enclosure 2 in axial alignment one on top of the other as by providing two sets of laterally spaced spool mounts 35, 36 of different lengths extending axially outwardly from the enclosure back wall 3 (see FIG. 3). A set of mounting holes 37, 37' in the hub portion 26, 26' of each spool 10, 10' may be aligned with either set of spool mounts 35, 36 for removably attaching either spool to either set of spool mounts by inserting different length fasteners 38, 39 through the respective mounting holes for threaded engagement in threaded bores 40, 41 in the spool mounts. A set of slots or openings 42, 42' is provided in each spool hub 26, 26' for extension of the longer set of spool mounts 36 through the slots or openings in the spool that is mounted on the shorter set of spool mounts 35.

Figure 4:
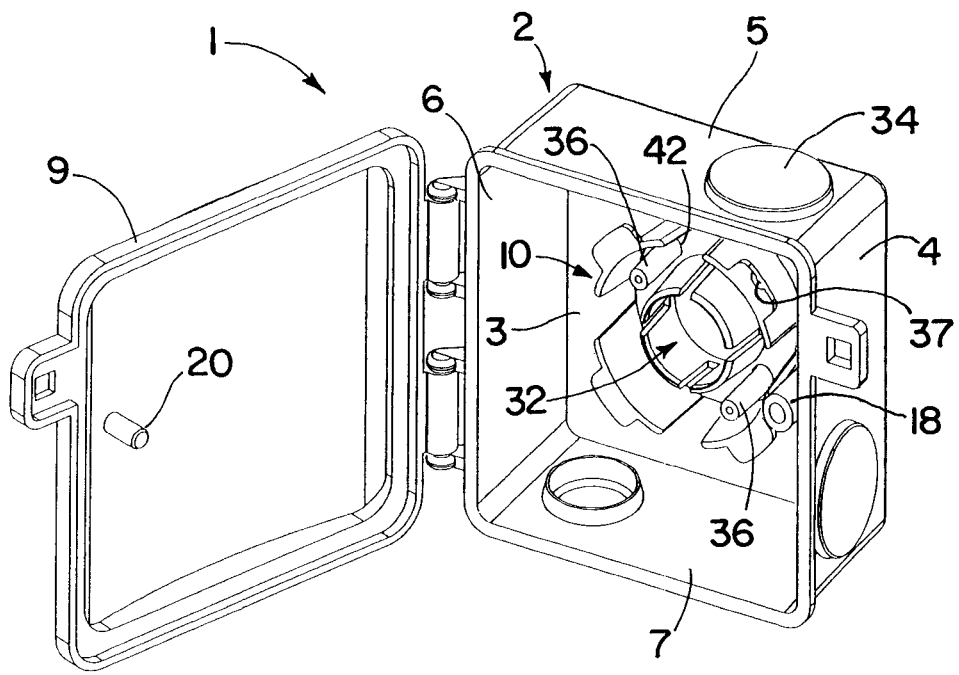
FIG. 4 is a perspective view similar to FIG. 1 but showing a single slack cable storage spool mounted in a lower position inside the box.
Figure 5:
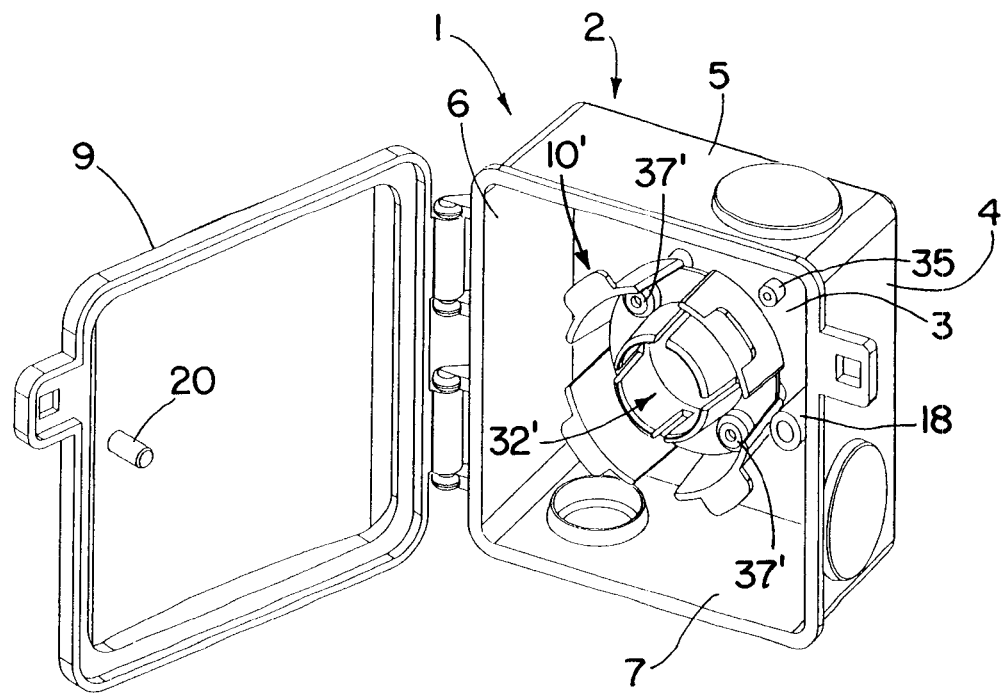
FIG. 5 is a perspective view similar to FIG. 1 but showing a single slack cable storage spool mounted in a raised position inside the box.

Alternatively, only one of the spools 10, 10' may be mounted within the enclosure if that is all that is needed to store the desired amount of slack cable within a particular box. In that event, one of the spools 10, 10' may either be mounted in the lower position shown in FIG. 4 or in the raised position shown in FIG. 5, depending on whether it may be desirable to have additional space above or below the spool. Such additional space may be used, for example, for storage of additional materials inside the box, or to help maintain the minimum bend radius in the cable when the cable is fed into and out of one or more of the side holes 28-30 in the box or through the center hole 31 in the bottom of the box.

Although the invention has been shown and described with respect to a certain embodiment, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function of the herein illustrated exemplary embodiment of the invention. In addition, while a particular feature of the invention may have been disclosed with respect to only one embodiment, such feature may be combined with one or more other features as may be desired and advantageous for any given or particular application.

What is claimed is:

1. A slack cable storage box comprising an enclosure, at least one slack cable storage spool mountable at different coaxial heights within the enclosure for storing a length of cable within the enclosure, and mounting means for coaxially mounting the spool at different coaxial heights within the enclosure.

2. The box of claim 1 wherein said mounting means comprises at least two sets of spool mounts of different length extending axially outwardly from a back wall of the enclosure in laterally spaced relation from each other for coaxially mounting the spool at different coaxial heights within the enclosure.

3. The box of claim 2 wherein the spool includes a hub portion having at least one pair of mounting holes for attaching the spool to either set of spool mounts, and at least one set of slots or openings extending through the hub portion for extension of the longer set of spool mounts through the slots or openings when the at least one spool is coaxially mounted on the shorter set of spool mounts.

4. The box of claim 1 wherein either of at least two slack cable storage spools are mountable at different coaxial heights within the enclosure in coaxial alignment with one on top of the other.

5. The box of claim 4 wherein each of the spools includes a plurality of spool segments with circumferentially spaced gaps between the spool segments that provide cable access through the gaps.

6. The box of claim 5 wherein the spool segments of each of the spools are in coaxial alignment with each other when the spools are mounted in coaxial alignment on top of one another within the enclosure.

7. The box of claim 5 wherein each of the spools has an open center that at least partially overlies an opening in a back wall of the enclosure to permit the cable to be fed through the back wall opening through the open center of each of the spools.

8. The box of claim 1 wherein the enclosure has a back wall and side walls and an open front, and a cover is hinged to one side wall of the enclosure for closing the open front.

9. The box of claim 8 further comprising a cover attachment post extending axially outwardly from the back wall of the enclosure located radially outwardly of the at least one spool when mounted within the enclosure, the cover attachment post having a threaded bore for threaded receipt of a fastener extending through a fastener opening in the cover.

10. The box of claim 1 wherein side walls of the enclosure have one or more openings to permit cable to be fed into or out of the enclosure through one or more of the openings.

11. The box of claim 10 wherein the at least one spool includes a plurality of spool segments with circumferentially spaced gaps between the spool segments for passage of cable between the spool segments.

12. The box of claim 11 wherein the at least one spool includes an open center that at least partially overlies an opening in a back wall of the enclosure to permit cable to be fed through the open center and back wall opening into and out of the enclosure.

13. A slack cable storage box comprising an enclosure having a back wall and side walls and an open front, a cover for closing the open front, one or more slack cable storage spools mountable within the enclosure for storing a length of cable within the enclosure, and at least two sets of laterally spaced spool mounts extending axially outwardly from the back wall, the two sets of spool mounts being of different length for coaxially mounting at least two slack cable storage spools at different coaxial heights within the enclosure, wherein each of the spools includes a set of mounting holes for attaching either of the spools to either set of the spool mounts, and a set of slots or openings in each of the spools for extension of the longer set of spool mounts through the slots or openings of the spool that is mounted on the shorter set of spool mounts.

14. A slack cable storage box comprising an enclosure, at least one slack cable storage spool mountable within the enclosure for storing a length of cable within the enclosure, and mounting means for mounting the spool at different heights within the enclosure, wherein at least two slack cable storage spools are mountable within the enclosure in coaxial alignment with one on top of the other, and wherein the mounting means comprises at least two sets of spool mounts of different lengths extending axially outwardly from a back wall of the enclosure in laterally spaced relation from one another, and each of the spools includes at least one set of mounting holes for attachment of either of the spools to either set of spool mounts, and at least one set of slots or openings extending through each of the spools for extension of the longer set of spool mounts through the slots or openings in the spool that is mounted on the shorter set of spool mounts.

* * * * *